United States Patent
Takahashi et al.

(10) Patent No.: US 6,870,327 B2
(45) Date of Patent: Mar. 22, 2005

(54) ELECTRODE-LESS DISCHARGE LAMP LIGHTING APPARATUS, BULB-SHAPED ELECTRODE-LESS FLUORESCENT LAMP, AND DISCHARGE LAMP LIGHTING APPARATUS

(75) Inventors: Kenichirou Takahashi, Katano (JP); Satoshi Kominami, Katano (JP); Kouji Miyazaki, Hirakata (JP); Toshiaki Kurachi, Hirakata (JP); Mamoru Takeda, Soraku-gun (JP); Nobuyoshi Nagagata, Yawata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/713,115

(22) Filed: Nov. 17, 2003

(65) Prior Publication Data

US 2004/0100205 A1 May 27, 2004

Related U.S. Application Data

(63) Continuation of application No. PCT/JP03/10610, filed on Aug. 22, 2003.

(51) Int. Cl.$^7$ .............................................. H05B 41/16
(52) U.S. Cl. ...................... 315/248; 315/291; 315/307; 315/360; 315/DIG. 4
(58) Field of Search ........................ 315/200 R, 209 R, 315/224–226, 244, 248, 291, 299, 301, 307, 360, DIG. 4, DIG. 7

(56) References Cited

U.S. PATENT DOCUMENTS

| | | | |
|---|---|---|---|
| 5,243,261 A | * | 9/1993 | Bergervoet et al. ......... 315/248 |
| 5,952,792 A | | 9/1999 | Borowiec et al. ........... 315/248 |
| 6,509,698 B1 | * | 1/2003 | Kominami et al. ......... 315/291 |
| 6,545,431 B2 | * | 4/2003 | Hui et al. .................... 315/291 |
| 6,661,185 B2 | * | 12/2003 | Kominami et al. ......... 315/291 |
| 2001/0030514 A1 | | 10/2001 | Takahashi et al. .......... 315/219 |
| 2002/0047645 A1 | | 4/2002 | Kominami et al. ......... 315/308 |

FOREIGN PATENT DOCUMENTS

| | | |
|---|---|---|
| JP | 1-138964 | 5/1989 |
| JP | 7-57886 | 3/1995 |
| JP | 11-111486 | 4/1999 |
| JP | 2002-367794 | 12/2002 |
| JP | 2003-317989 | 11/2003 |

* cited by examiner

Primary Examiner—Thuy Vinh Tran
(74) Attorney, Agent, or Firm—Wenderoth, Lind & Ponack, L.L.P.

(57) ABSTRACT

An electrode-less discharge lamp lighting apparatus which is electrically connected to a dimming unit (2) is provided with: an electrode-less fluorescent lamp (3); and a lighting circuit (4) operable to apply a high-frequency voltage to the electrode-less fluorescent lamp (3), wherein the lighting circuit (4) includes: an AC/DC converting unit (5) operable to convert a phase-controlled AC voltage outputted from the dimming unit (2) into a DC voltage; a DC/AC converting unit (6) operable to convert the DC voltage into a high-frequency voltage; and a dimming controlling unit (7) that includes a resistor (29), a switching element (28), and a timer circuit (27) so as to detect a timing of a turn-on of the phase-controlled AC voltage and to, based on the detected timing, allow a current whose value is at least a threshold to flow across output terminals of the AC/DC converting unit (5) for at least a duration of a time lag between the turn-on of the phase-controlled AC voltage and the generation of the high-frequency voltage by the DC/AC converting unit (6).

15 Claims, 9 Drawing Sheets

ELECTRODE-LESS DISCHARGE LAMP LIGHTING APPARATUS, BULB-SHAPED ELECTRODE-LESS FLUORESCENT LAMP, AND DISCHARGE LAMP LIGHTING APPARATUS

This is a Continuation Application of International Application No. PCT/JP03/10610, filed Aug. 22, 2003.

TECHNICAL FIELD

The present invention relates to a discharge lamp lighting apparatus and an electrode-less discharge lamp lighting apparatus, and in particular to a bulb-shaped electrode-less fluorescent lamp with a dimming capability.

BACKGROUND ART

Compared to an incandescent bulb, a fluorescent lamp has higher efficiency and a longer life. On that account, the fluorescent lamp has come into wide use in terms of the global environmental protection and cost effectiveness. In recent years, a bulb-shaped fluorescent lamp with no electrodes has received attention as an economical light source and is now in increasing demand because its life is several-fold longer than a conventional bulb-shape fluorescent lamp with electrodes.

Also, a bulb-shaped fluorescent lamp that is designed to include a fluorescent lamp and a lighting circuit in one piece has also received attention as an energy-saving light source used in housing spaces, hotels, restaurants, and so forth. One of the reasons for the widespread use is that the bulb-shaped fluorescent lamp can be easily set and used just the way a conventional bulb has been used. The bulb-shaped fluorescent lamp has been developed for an electrode-less fluorescent lamp as well as an electrode fluorescent lamp.

As the bulb-shaped fluorescent lamp has become in wide use, there is a new need for the lamp to have a dimming capability like the incandescent bulb. A more specific explanation is given. In hotels or housing spaces, for example, people enjoy a variety of activities, such as reading and having a good time with their families. For each activity, they wish to have an appropriate light intensity so as to stay in a comfortable lighting environment. As such, a bulb-shaped fluorescent lamp having a dimming capability is required.

The light intensity of a bulb can be easily changed simply by adjusting a supplied amount of electricity because the bulb does not emit light by discharging. On the other hand, unlike the bulb, the fluorescent lamp emits light by discharging, and therefore it is difficult to realize a fluorescent lamp with a dimming capability whose functional level is high enough to be practically used.

Recently, responding to user needs for a fluorescent lamp whose light intensity can be adjusted using an existing dimmer designed for a bulb, a bulb-shaped fluorescent lamp with electrodes has been developed. The adjustment in the light intensity of this lamp can be achieved by connecting the lamp to a dimmer designed for a bulb. An example of such is disclosed in Japanese Laid-Open Patent Application No. 11-111486. However, an electrode-less bulb-shaped fluorescent lamp with a dimming capability has not developed so far.

While developing the electrode-less bulb-shaped fluorescent lamp with the dimming capability, the Applicant found the following problems. Suppose to employ an electrode-less discharge lamp lighting apparatus that adjusts the light intensity of the lamp by changing the ratio of lighting-up and lighting-off periods while bringing a turn-on of the alternating current voltage that has been phase-controlled by a dimmer designed for a bulb in sync with an on timing of a lighting-up by intermittent drive. Hereinafter, alternating and direct currents are respectively referred to as "AC" and "DC" in the present specification. Using this electrode-less discharge lamp lighting apparatus, due to an operating delay of an inverter circuit, or a DC/AC converter, the on timing of the lighting-up period sometimes lags behind the turn-on of the phase-controlled AC voltage. Because of this time lag, even after the dimmer is activated by the turn-on of the phase-controlled AC voltage, a current equal to or smaller than a holding current of a triac included in the dimmer is caused upon the turn-on of the AC voltage. As a result, the triac is reopened and the phase-controlled AC voltage is transformed, in other words, the dimmer malfunctions. The detailed explanation regarding this problem will be given below in the preferred embodiments of the present invention.

When this malfunction happens, flicker and no lights, i.e., discontinuous luminous change may occur to the bulb-shaped discharge lamp, making a user uncomfortable. To be more specific, using an incandescent bulb, the user is not bothered with such a problem because the luminous change of the incandescent bulb is continuous even when adjusting the light intensity. However, once having used the incandescent bulb, the user will become sensitive to the discontinuous luminous change of the bulb-shaped electrode-less fluorescent lamp and will experience considerable discomfort.

To solve this problem, the object of the present invention is to provide an electrode-less discharge lamp lighting apparatus, a bulb-shaped electrode-less fluorescent lamp, and a discharge lamp lighting apparatus which suppress discontinuous luminous change by preventing a malfunction from occurring to a dimmer.

DISCLOSURE OF INVENTION

The stated object can be achieved by an electrode-less discharge lamp lighting apparatus which is electrically connected to a dimming unit, the electrode-less discharge lamp lighting apparatus being provided with: an electrode-less discharge lamp; and a lighting circuit operable to apply a high-frequency voltage to the electrode-less discharge lamp, wherein the lighting circuit includes: an AC/DC converting unit operable to convert a phase-controlled AC voltage outputted from the dimming unit into a DC voltage; a DC/AC converting unit operable to convert the DC voltage into a high-frequency voltage and operable to intermittently drive the electrode-less discharge lamp by applying the high-frequency voltage to the electrode-less discharge lamp during a lighting-up period of the electrode-less discharge lamp so that the electrode-less discharge lamp illuminates and by halting a generation of the high-frequency voltage during a lighting-out period of the electrode-less discharge lamp so that the electrode-less discharge lamp is extinguished; and a dimming controlling unit operable to detect a timing of a turn-on of the phase-controlled AC voltage, wherein, based on the detected timing, the dimming controlling unit outputs an intermittent command signal to vary a ratio between the lighting-up and lighting-out periods and allows a current whose value is at least a threshold to flow across output terminals of the AC/DC converting unit for at least a duration of a time lag between the turn-on of the phase-controlled AC voltage and the generation of the high-frequency voltage by the DC/AC converting unit.

Here, the dimming unit may include a switching element operable to pass a current in both directions, and the threshold may be a value of a minimum current required for the switching element to keep a turn-on state. To be more specific, the switching element may be a triac, and the threshold may be a value of a holding current of the triac.

With the above construction, the current equal to or larger than the holding current is forcefully applied to the triac for a duration between the turn-on of the triac included in the dimming unit and the generation of the high-frequency current. Moreover, the current is allowed to keep flowing through the triac during the turn-on period of the triac. Therefore, problems occurring to the discharge lamp, such as flicker, caused by the interruption in current flow can be prevented.

To realize a current drawing circuit as described above, the dimming controlling unit may include: a timer circuit operable to output a signal indicating a period of time that lasts at least the time lag; and a switching element operable to allow a current whose value is at least the threshold to flow across the output terminals of the AC/DC converting unit via a resistor for the period of time indicated by the signal inputted by the timer circuit. In this case, it is preferable that the dimming controlling unit further includes: a dimming control signal inputting circuit operable to output a signal indicating the turn-on of the phase-controlled AC voltage; and a signal transmitting circuit operable to transmit the signal outputted from the dimming control signal inputting circuit to the timer circuit in a state where the signal transmitting circuit is electrically isolated. By doing so, noise can be reduced and the overall operation will be executed with stability.

Also, the timer circuit may include: a capacitor; a differentiating circuit operable to differentiate the signal transmitted by the signal transmitting circuit; a switching element operable to allow the capacitor one of to be charged and to discharge in accordance with an output from the differentiating circuit; and a comparator operable to compare an electric potential of the capacitor to a predetermined electric potential and output a signal as a comparison result that indicates the period of time that lasts at least the time lag. Alternatively, a construction where a capacitor or the like is externally added to a ready-made timer IC may be employed.

Moreover, it is preferable that the dimming controlling unit, when a dimming state set by the intermittent command signal is one of a full-state and a dimmed state, allows the current whose value is at least the threshold to flow across the output terminals of the AC/DC converting unit for at least the duration of the time lag between the turn-on of the phase-controlled AC voltage and the generation of the high-frequency voltage by the DC/AC converting unit.

Furthermore, the dimming controlling unit may further include: a sawtoothed wave signal generating circuit operable to generate one of a sawtoothed wave signal and a triangular wave signal that is synchronized with the timing of the turn-on of the phase-controlled AC voltage; a dimming command signal generating circuit operable to generate a dimming command signal that carries a voltage corresponding to a period of time during which the phase-controlled AC voltage is turned on; and a comparator operable to compare one of the sawtoothed wave signal and the triangular wave signal to the dimming command signal and output the intermittent command signal as a comparison result. In this case, it is preferable that the dimming controlling unit further includes: a dimming control signal inputting circuit operable to output a signal indicating the turn-on of the phase-controlled AC voltage; and a signal transmitting circuit, such as a photo-coupler, operable to transmit the signal outputted from the dimming control signal inputting circuit to the sawtoothed wave signal generating circuit in a state where the signal transmitting circuit is electrically isolated. By doing so, noise can be reduced and the overall operation will be executed with stability.

Also, the sawtoothed wave signal generating circuit may include: a capacitor; a differentiating circuit operable to differentiate the signal transmitted by the signal transmitting circuit; a switching element operable to allow the capacitor one of to be charged and to discharge in accordance with an output from the differentiating circuit; and an outputting circuit operable to output an electric potential of the capacitor as one of the sawtoothed wave signal and the triangular wave signal. Alternatively, the sawtoothed wave generating circuit may be replaced by a circuit using an IC like a monostable multivibrator.

The above object can also be achieved by a bulb-shaped electrode-less fluorescent lamp which is electrically connected to a dimming unit, the bulb-shaped electrode-less fluorescent lamp being provided with: an electrode-less fluorescent lamp; a lighting circuit operable to apply a high-frequency voltage to the electrode-less fluorescent lamp; and a base operable to electrically connect the dimming unit to the lighting circuit, wherein the electrode-less fluorescent lamp, the lighting circuit, and the base are formed in one piece in a shape of a bulb, and wherein the lighting circuit includes: an AC/DC converting unit operable to convert a phase-controlled AC voltage outputted from the dimming unit via the base into a DC voltage; a DC/AC converting unit operable to convert the DC voltage into a high-frequency voltage and operable to intermittently drive the electrode-less discharge lamp by applying the high-frequency voltage to the electrode-less fluorescent lamp during a lighting-up period of the electrode-less fluorescent lamp so that the electrode-less fluorescent lamp illuminates and by halting a generation of the high-frequency voltage during a lighting-out period of the electrode-less fluorescent lamp so that the electrode-less fluorescent lamp is extinguished; and a dimming controlling unit operable to detect a timing of a turn-on of the phase-controlled AC voltage, wherein, based on the detected timing, the dimming controlling unit outputs an intermittent command signal to vary a ratio between the lighting-up and lighting-out periods and allows a current whose value is at least a threshold to flow across output terminals of the AC/DC converting unit for at least a duration of a time lag between the turn-on of the phase-controlled AC voltage and the generation of the high-frequency voltage by the DC/AC converting unit. In other words, using an electrode-less fluorescent lamp as the electrode-less discharge lamp, the overall construction may be formed in one piece in the shape of a bulb or the like.

Here, the electrode-less fluorescent lamp may have a concave part, and an induction coil to which the high-frequency voltage is applied may be inserted into the concave part.

Moreover, the above object can be achieved by a discharge lamp lighting apparatus which is electrically connected to a dimming unit, being provided with: a discharge lamp; and a lighting circuit operable to apply a high-frequency voltage to the discharge lamp, wherein the lighting circuit includes: an AC/DC converting unit operable to convert a phase-controlled AC voltage outputted from the dimming unit into a DC voltage; a DC/AC converting unit operable to convert the DC voltage into a high-frequency voltage and operable to intermittently drive the discharge lamp by applying the high-frequency voltage to the discharge lamp during a lighting-up period of the discharge lamp so that the discharge lamp illuminates and by halting a generation of the high-frequency voltage during a lighting-out period of the discharge lamp so that the discharge lamp is extinguished; and a dimming controlling unit operable to detect a timing of a turn-on of the phase-controlled AC voltage, wherein, based on the detected timing, the dimming controlling unit outputs an intermittent command signal to vary a ratio between the lighting-up and lighting-out periods and allows a current whose value is at least a threshold to flow across output terminals of the AC/DC converting unit for at least a duration of a time lag between the turn-on of the phase-controlled AC voltage and the generation of the high-frequency voltage by the DC/AC converting unit. Accordingly, the present invention can be realized not only as an electrode-less discharge lamp and the electrode-less discharge lamp lighting apparatus but also as an electrode discharge lamp and an electrode discharge lamp lighting apparatus.

BEST MODE FOR CARRYING OUT THE INVENTION

The following is a description of embodiments of the present invention, with reference to the drawings. In these embodiments, components that have the substantially same function are assigned the same numeral for the ease of explanation.

(First Embodiment)

Figure 1:
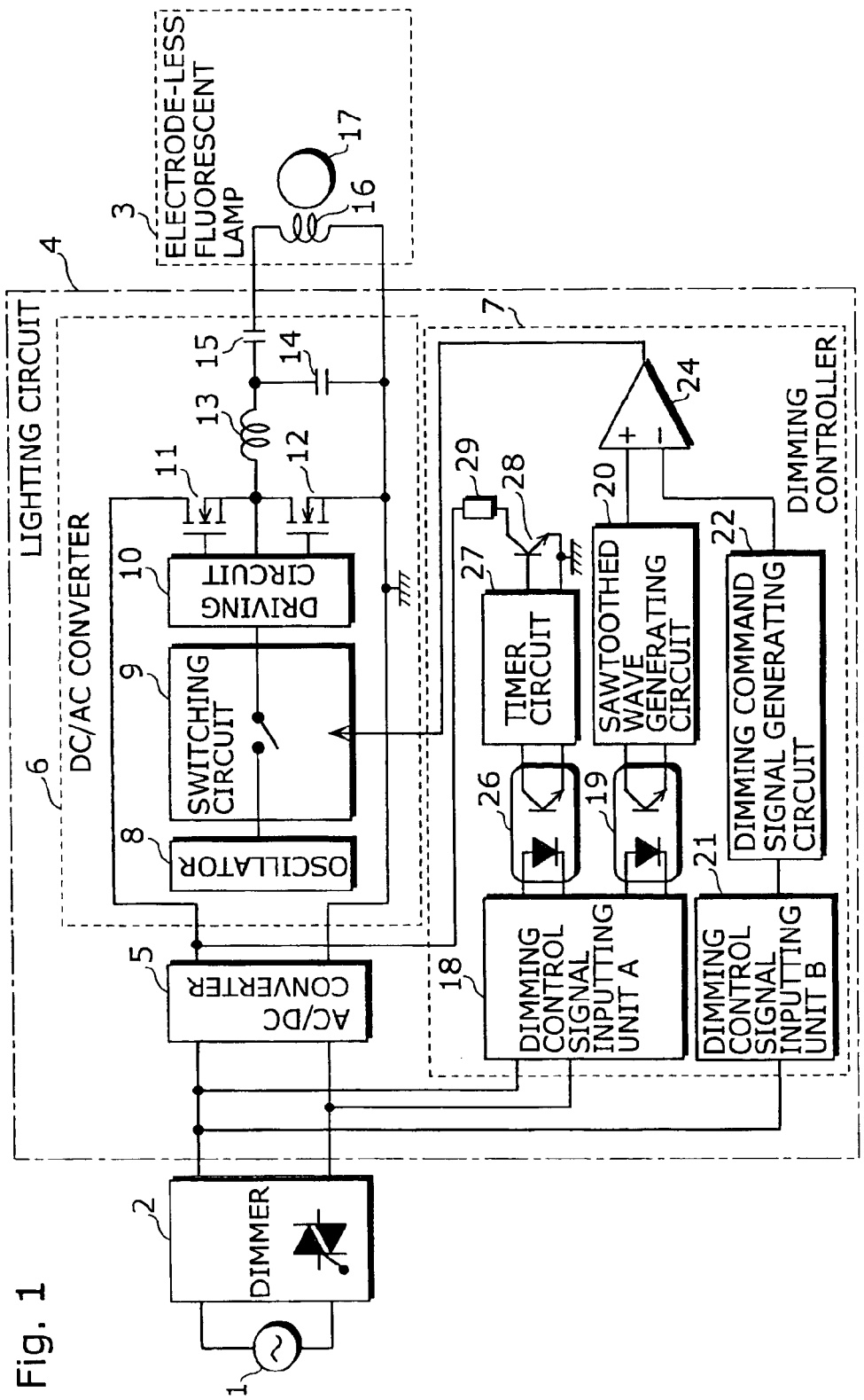
FIG. 1 is a block diagram showing the overall construction of an electrode-less discharge lamp lighting apparatus and a bulb-shaped electrode-less fluorescent lamp of a first embodiment of the present invention.

FIG. 1 is a block diagram showing the overall circuit construction of a discharge lamp lighting apparatus of a first embodiment of the present invention. This discharge lamp lighting apparatus is capable of dimming light for an electrode-less fluorescent lamp which is a kind of discharge lamps, and is mainly composed of a lighting circuit 4 and an electrode-less fluorescent lamp 3. In FIG. 1, an AC power 1 and a dimmer 2 are also shown together with the discharge lamp lighting apparatus.

Figure 2:
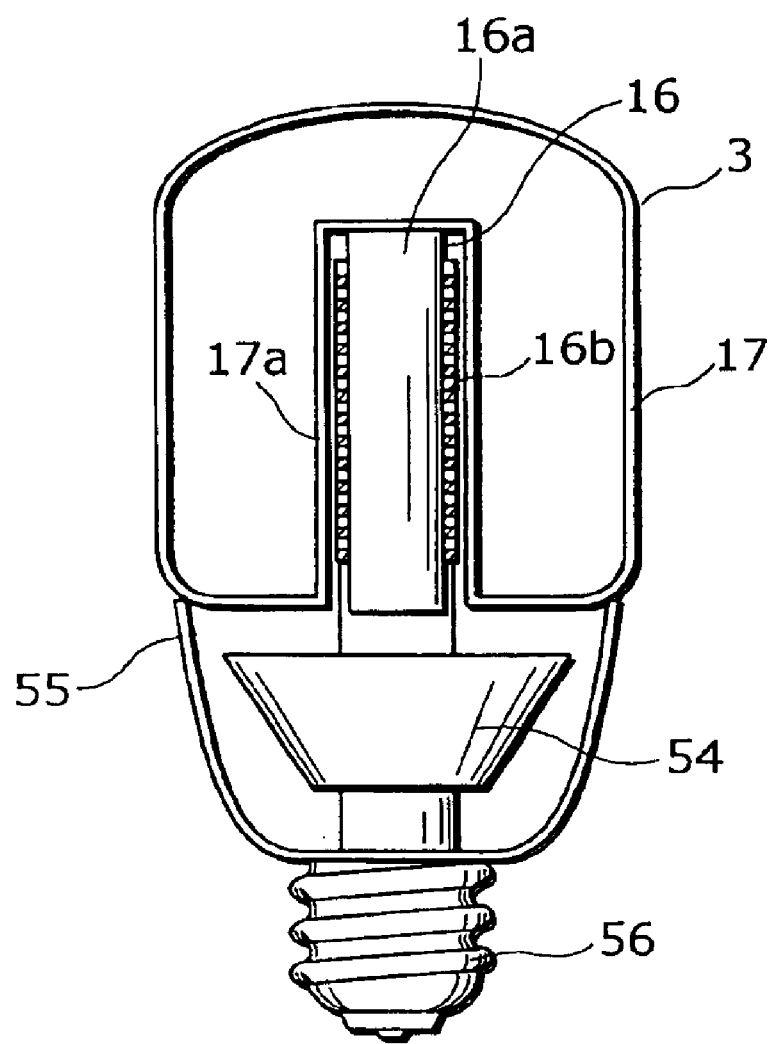
FIG. 2 is a schematic cross-sectional diagram showing the construction of the bulb-shaped electrode-less fluorescent lamp in the first embodiment.

FIG. 2 is a schematic cross-sectional diagram where a bulb-shaped electrode-less fluorescent lamp is realized as one example of the discharge lamp lighting apparatus. As shown, this bulb-shaped electrode-less fluorescent lamp is composed of the electrode-less fluorescent lamp 3, a circuit board 54, and a base 56. Here, the circuit board 54 includes the lighting circuit 4 shown in FIG. 1, and applies a high-frequency voltage to the electrode-less fluorescent lamp 3. To be more specific, the circuit board 54 includes various kinds of circuit components of the lighting circuit 4, and the necessary wiring is installed on the circuit board 54. The base 56 is electrically connected to the circuit board 54, or equivalently, to the lighting circuit 4.

As shown in FIG. 2, the bulb-shaped electrode-less fluorescent lamp is made up of the electrode-less fluorescent lamp 3, the lighting circuit 4 of the circuit board 54, and the base 56 which are all formed in one piece in the shape of a bulb. Here, the electrode-less fluorescent lamp 3 includes a discharge bulb 17 that has a concave part 17a. An induction coil 16 including a ferrite core 16a and a coil 16b is inserted into the concave part 17a. The coil 16b is electrically connected to the circuit board 54 that is covered with a covering member 55. The base 56 is fitted at the lower end of the covering member 55, and is electrically connected to the circuit board 54. As an example of the base 56, an E26 type designed for an incandescent bulb may be employed. By screwing the base 56 into a socket designed for an incandescent bulb, power is supplied and the electrode-less fluorescent lamp 3 lights up. The AC voltage inputted through the base 56 is phase-controlled by, for example, an external phase controlling apparatus. In the present embodiment, the dimmer 2 serves as such, and ideally, a dimmer designed for an incandescent bulb may be used.

Figure 3:
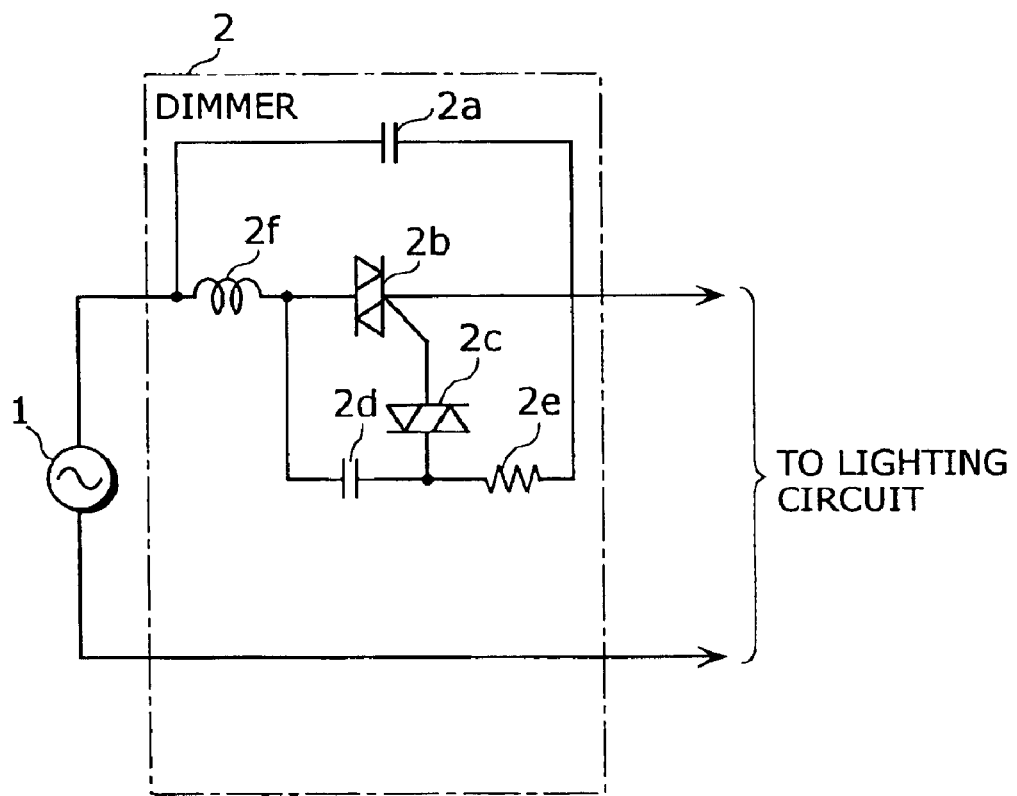
FIG. 3 is a schematic circuit diagram of a dimmer.

The AC power 1 shown in FIG. 1 may be utility power of 60 Hz with 100V, and is connected to the dimmer 2. The dimmer 2 performs the phase control using a triac. As shown in FIG. 3, the dimmer 2 is composed of a capacitor 2a, a triac 2b, a bidirectional trigger diode 2c, a capacitor 2d, a variable resistor 2e, and an inductor 2f. The triac 2b is a switching element which is capable of conducting in both directions. The bidirectional trigger diode 2c sends a trigger signal to a gate of the triac 2b. The capacitor 2d and the variable resistor 2e adjust a phase appearing when the bidirectional trigger diode 2c issues a trigger signal. The capacitor 2a and the inductor 2f form a high-frequency noise filter. Here, as the dimmer 2, a dimmer designed for an incandescent bulb can be employed.

Figure 8:
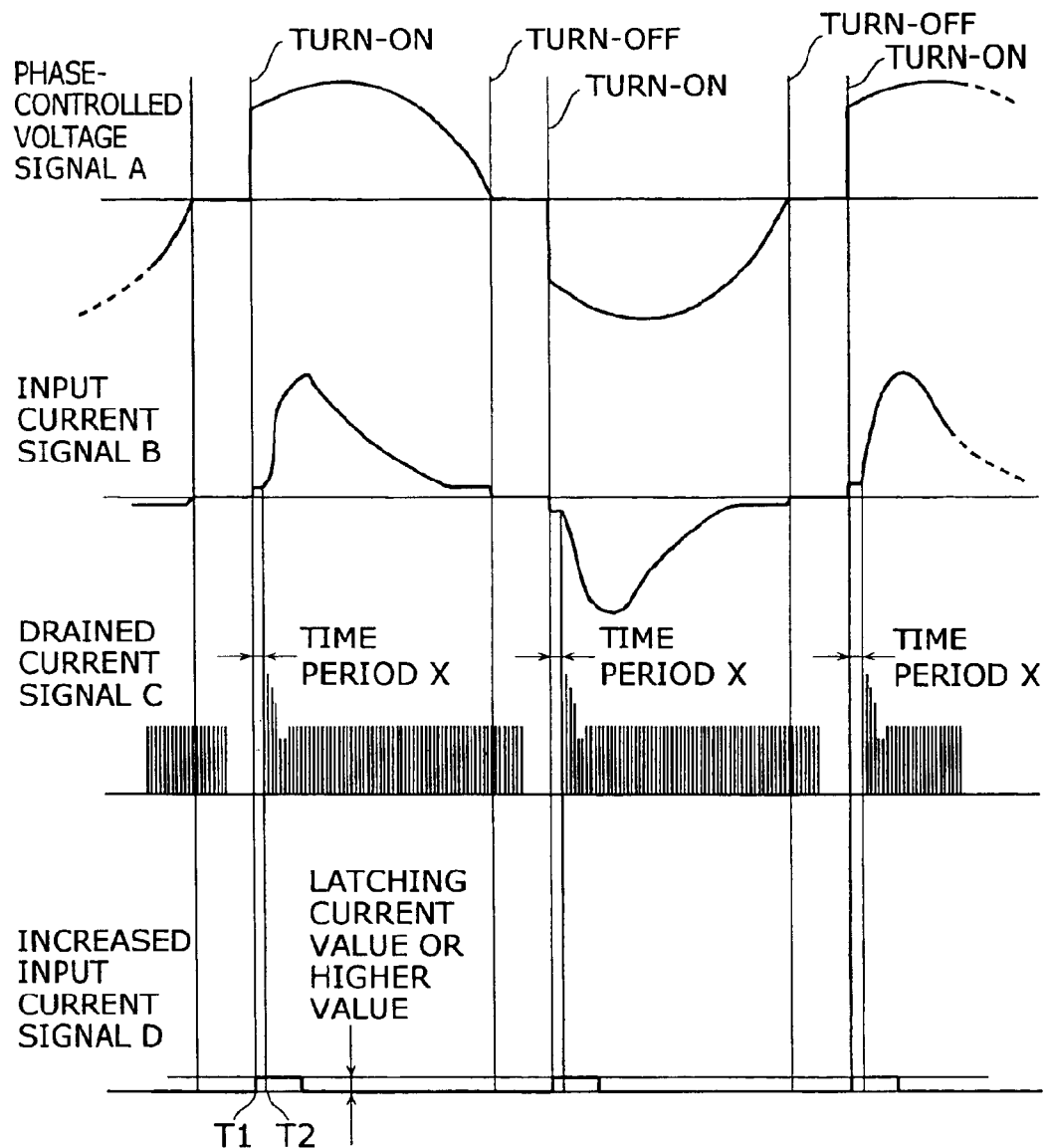
FIG. 8 is a diagram showing waveforms generated when the dimmer functions normally.

Using the dimmer 2 as explained above, the capacitor 2d is charged via the variable resistor 2e in accordance with an output voltage from the AC power 1. Then, when the voltage of each terminal of the capacitor 2d reaches a breakover voltage of the bidirectional trigger diode 2c, the electric charge accumulated in the capacitor 2d is discharged via the bidirectional trigger diode 2c. A pulse signal gained here triggers the triac 2b and brings the triac 2b into conduction for the remaining portion out of a half cycle of the AC voltage of the AC power 1 after the trigger by the pulse signal. Accordingly, by changing a resistance value of the variable resistor 2e, the phase-controlled AC voltage is supplied from the dimmer 2 to the lighting circuit 4. The phase-controlled AC voltage here may be represented by a phase-controlled voltage waveform that will be explained below with reference to FIG. 8. This phase-controlled AC voltage becomes zero for a specific phase period as shown in FIG. 8. Note that, in the present embodiment, the phase-controlled AC voltage becomes so every half a cycle.

The lighting circuit 4 is composed of an AC/DC converter 5, a DC/AC converter 6, and a dimming controller 7. The AC/DC converter 5 converts a phase-controlled AC voltage into a direct voltage. The DC/AC converter 6 converts the DC voltage outputted from the AC/DC converter 5 into a high-frequency voltage. The dimming controller 7 controls the AC/DC converter 5 and the DC/AC converter 6. Here, the AC/DC converter 5, the DC/AC converter 6, and the dimming controller 7 may be referred to as a smoothing DC voltage converter, an inverter, and a detector respectively.

The lighting circuit 4 is connected to the AC power 1 via the dimmer 2 that controls a voltage phase of the AC power 1. The lighting circuit 4 generates a high-frequency voltage in accordance with the turn-on period of the voltage that has been phase-controlled by the dimmer 2. By means of this high-frequency voltage, the electrode-less fluorescent lamp 3 lights up.

The AC/DC converter 5 converts the phase-controlled voltage supplied from the dimmer 2 into a DC voltage. The AC/DC converter 5 may be composed of a diode bridge and a smoothing capacitor.

The DC/AC converter 6 converts the DC voltage converted by the AC/DC converter 5 into a high-frequency voltage. Then, the DC/AC converter 6 applies the high-frequency voltage to the electrode-less fluorescent lamp 3, more specifically, to the induction coil 16, during the lighting-up period of the lamp 3. During the lighting-out period, on the other hand, the DC/AC converter 6 halts the generation of the high-frequency voltage so as to put the light out. In this way, the DC/AC converter 6 drives the electrode-less fluorescent lamp 3 intermittently. To achieve this task, the DC/AC converter 6 shown in FIG. 1 is composed of an oscillator 8, a switching circuit 9, a driving circuit 10, a pair of MOSFETs (metal oxide silicon field effect transistors) 11 and 12 as switching elements, a resonant inductor 13, and a pair of resonant capacitors 14 and 15. Here, the resonant capacitor 15 is connected to the induction coil 16 in series. This serial circuit linking the resonant capacitor 15 and the induction coil 16 is, in turn, connected to the resonant capacitor 14 in parallel. The induction coil 16 and the electrode-less discharge bulb 17 make up the electrode-less fluorescent lamp 3. The induction coil 16 includes the ferrite core 16a and the coil 16b, and is inserted into the concave part 17a of the bulb 17 as shown in FIG. 2.

The dimming controller 7 performs two functions. The detailed explanation is given for each function as follows.

The first one is a so-called current drawing function. Regardless of whether the light intensity of the lamp 3 is in a full state or a dimmed state, the dimming controller 7 keeps applying a current equal to or larger than a threshold across the output terminals of the AC/DC converter 5 for at least a duration of a time lag between the turn-on of the phase-controlled AC voltage by the dimmer 2 and the generation of the high-frequency voltage by the DC/AC converter 6. Here, the current applied by the dimming controller 7 may be twice as large as the threshold. Note that the threshold refers to a holding current value of the triac 2b included in the dimmer 2 and denotes the minimum current value required to maintain the electrical continuity in the triac 2b.

The second function of the dimming controller 7 is a signal outputting function. The dimming controller 7 detects the output voltage from the dimmer 2, that is, the turn-on of the phase-controlled AC voltage. The dimming controller 7 then outputs an intermittent command signal to the DC/AC converter 6, especially to the switching circuit 9, so as to change the ratio between the lighting-up and lighting-out periods. In this way, the dimming controller 7 is capable of outputting a timing signal for synchronization between the turn-on of the AC voltage and the activation of the intermittent drive by the DC/AC converter 6. Therefore, the dimming controller 7 can be referred to as a synchronous duty modulating circuit.

To achieve these two functions, the dimming controller 7 is composed of a dimming control signal inputting unit A18, a pair of photo-couplers 19 and 26, a sawtoothed wave generating circuit 20, a timer circuit 27, a switching element 28, a resistor 29, a dimming control signal inputting unit B21, a dimming command signal generating circuit 22, and a comparator 24.

The dimming control signal inputting unit A18 includes a circuit to differentiate the phase-controlled AC voltage outputted from the dimmer 2. The unit A18 outputs a pulse indicating the turn-on of the phase-controlled AC voltage to the pair of photo-couplers 19 and 26.

The photo-couplers 19 and 26 provide electrical isolation respectively between the dimming control signal inputting unit A18 and the sawtoothed wave generating circuit 20, and between the dimming control signal inputting unit A18 and the timer circuit 27. Then, the photo-couplers 19 and 26 optically transmit the signals. These photo-couplers are provided in the lighting circuit 4 for noise reduction and improvement in the overall performance.

Figure 4:
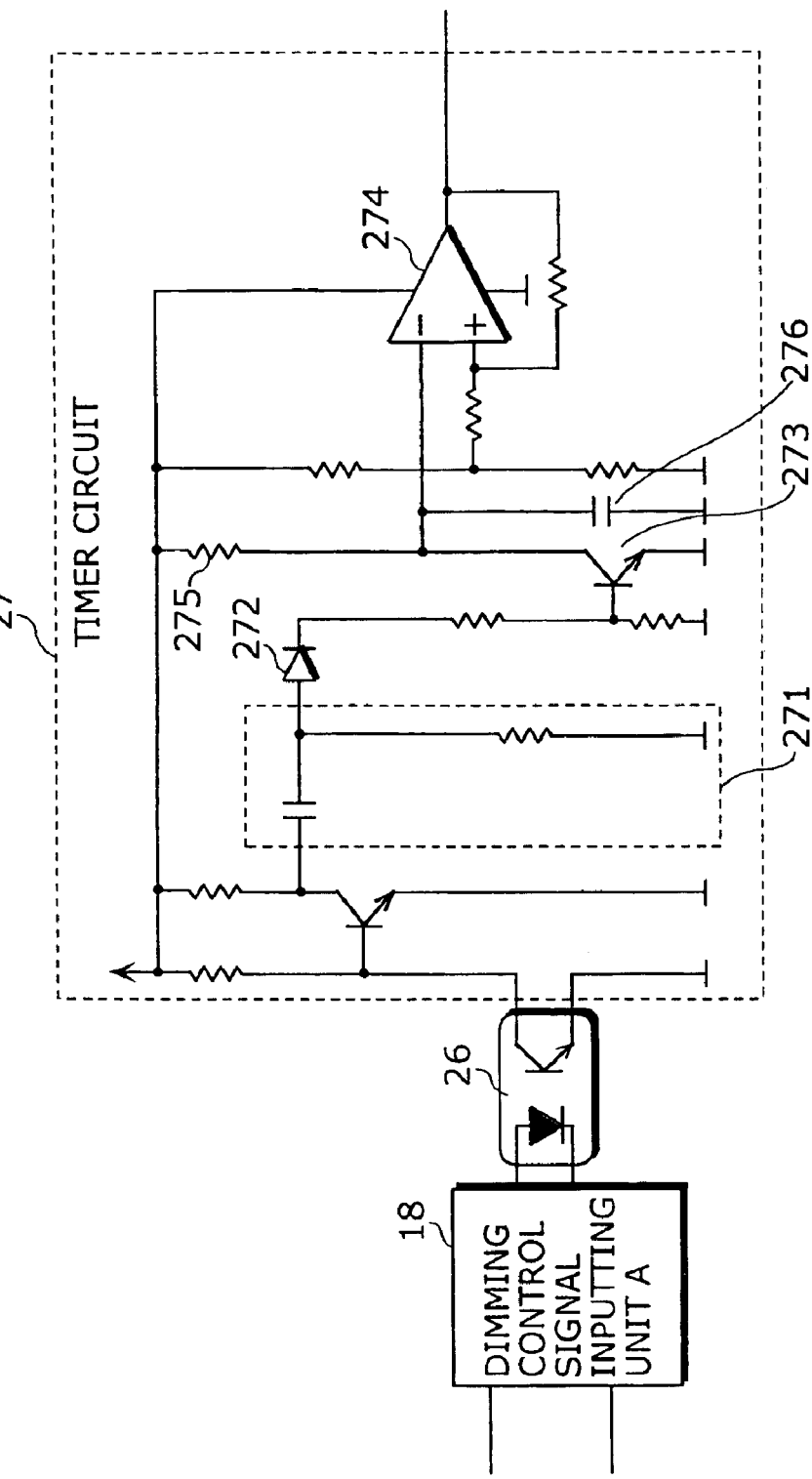
FIG. 4 is a schematic circuit diagram of a timer circuit.

The timer circuit 27 sets a predetermined period of time that is equal to or longer than the above-mentioned time lag between the turn-on of the phase-controlled AC voltage and the generation of the high-frequency voltage by the DC/AC converter 6. As shown in FIG. 4, the timer circuit 27 is composed of a differentiating circuit, a diode 272, a transistor 273, a comparator 274, a resistor 275, and a capacitor 276. When the pulse indicating the turn-on is inputted into the timer circuit 27 by the photo-coupler 26, the pulse passes through the differentiating circuit 271 and then activates the transistor 273 merely for a second. By this activation of the transistor 273, after the electric charge accumulated in the capacitor 276 is once discharged, the capacitor 276 begins to be recharged with current via the resistor 275. As a result, an electric potential of a non-inverse input terminal of the comparator 274 rises in accordance with a time constant set by the resistor 275 and the capacitor 276. The comparator 274 compares this electric potential to an electric potential of an inverse input terminal of the comparator 274 and then outputs the comparison result. Following this, the comparator 274 outputs a positive voltage pulse denoting the predetermined period of time that is equal to or longer than the above-mentioned time lag.

The switching element 28 is a driving transistor which establishes a ground for the output terminal, at a higher electric potential, of the AC/DC converter 5 via the resistor 29 while the timer circuit 27 outputs the positive voltage. Here, the other output terminal, at a lower electric potential, of the AC/DC converter 5 is grounded as shown in FIG. 1. Therefore, the switching element 28 forcefully passes a predetermined current set by the resistor 29 across the output terminals of the AC/DC converter 5, in other words, the element 28 plays a role of drawing a current. A resistance of the resistor 29 is set so that the current equal to or larger than the holding current is allowed to pass through the triac 2b of the dimmer 2.

Accordingly, regardless of whether the light intensity of the lamp 3 is in the full state or the dimmed state, the current equal to or larger than the threshold is allowed to pass across the output terminals of the AC/DC converter 5 for at least duration of the time lag between the turn-on of the phase-controlled AC voltage and the generation of the high-frequency voltage by the DC/AC converter 6. More specifically, the current equal to or larger than the holding current is allowed to keep passing through the triac 2b of the dimmer 2. As a consequence, problems such as flicker and no lights caused by the malfunction of the dimmer 2 are prevented from occurring to the electrode-less fluorescent lamp 3.

Figure 5:
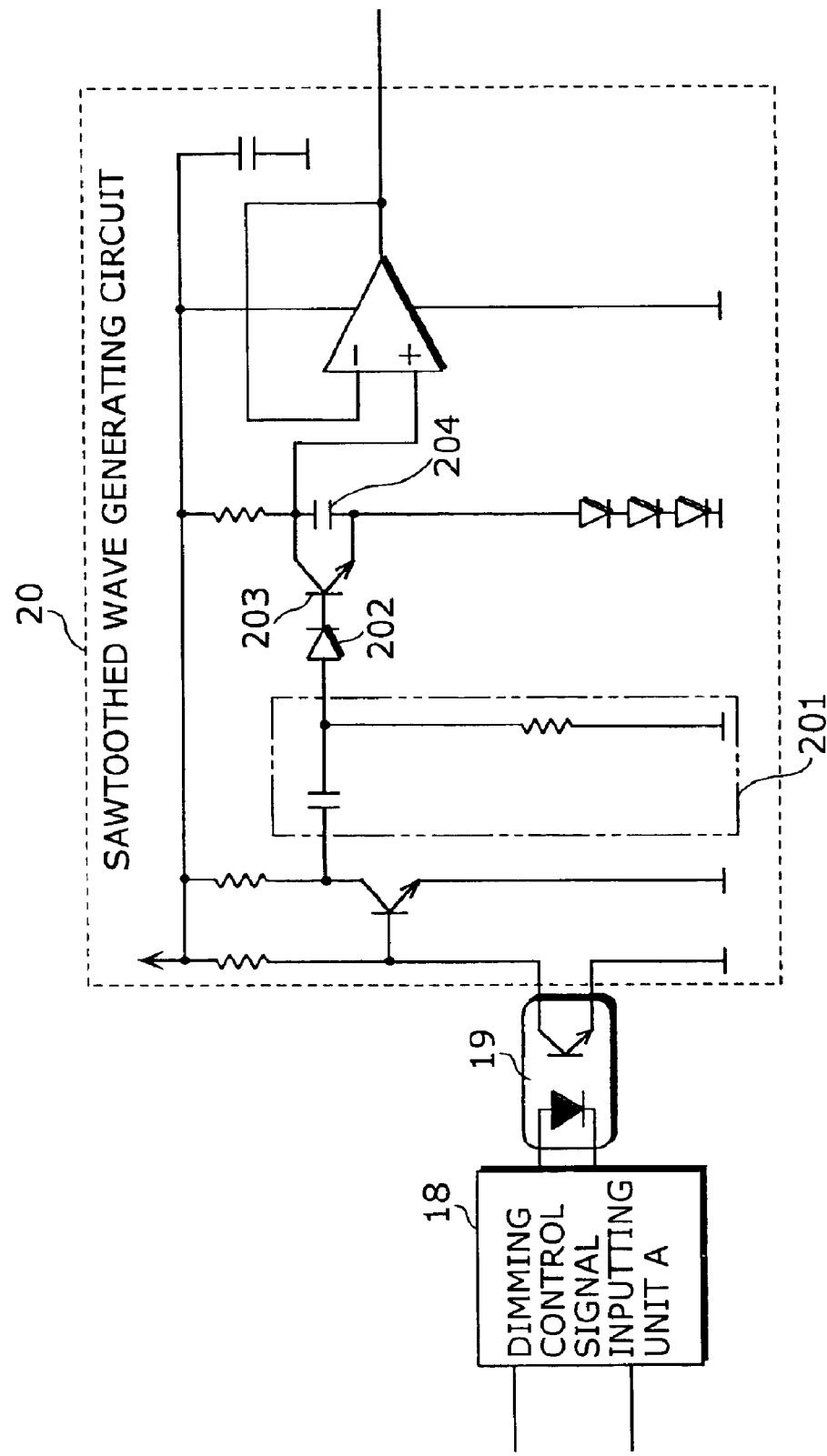
FIG. 5 is a schematic circuit diagram of a sawtoothed wave generating circuit.

Meanwhile, the pulse outputted from the dimming control signal inputting unit A18 is inputted into the sawtoothed wave generating circuit 20 via the photo-coupler 19. As shown in FIG. 5, the sawtoothed wave generating circuit 20 may include a differentiating circuit 201, a diode 202, a transistor 203, and a capacitor 204. The differentiating circuit 201 is connected to a collector terminal of a transistor of the photo-coupler 19 that generates a pulse wave in sync with the turn-on and turn-off of the phase-controlled AC voltage. An output terminal of the differentiating circuit 201 is connected to the anode of the diode 202, and a base terminal of the transistor 203 used for discharge is in turn connected to the cathode of the diode 202. The capacitor 204 used for charge and discharge is connected between collector and emitter terminals of the transistor 203. With this construction, the sawtoothed wave generating circuit 20 can generate a sawtoothed wave in sync with the turn-on of the phase-controlled AC voltage.

According to the pulse wave outputted from the photo-coupler 19, an output signal from the differentiating circuit 201 changes into a differential wave that is in sync with rising and falling edges of the pulse wave. Using the diode 202 with a low level of leakage current, a differential wave in sync only with rising edges is inputted into the base terminal of the transistor 203. The capacitor 204 connected between the collector and emitter terminals of the transistor 203 repeats charging and discharging by referring to the start-ups of the photo-coupler 19 as triggers, thereby generating a sawtoothed wave.

The dimming control signal inputting unit B21 is a half-wave rectifier circuit, and the dimming command signal generating circuit 22 is a smoothing circuit or the like. The phase-controlled AC voltage outputted from the dimmer 2 proceeds to a process of half-wave rectification performed by the dimming control signal inputting unit B21. Following this, the dimming command signal generating circuit 22 smoothes the half-rectified voltage into a DC voltage as a dimming command signal, which is next inputted into the inverse input terminal of the comparator 274. This dimming command signal rises in voltage with a DC voltage corresponding to an rms (root-mean-square) value of the phase-controlled voltage outputted from the dimmer 2. That is to say, the voltage of this signal rises with the duration of the turn-on period.

The comparator 24 is, for example, an operational amplifier that compares the voltage of the sawtoothed wave inputted in the non-inverse input terminal to the voltage of the dimming command signal inputted in the inverse input terminal. Then, the comparator 24 outputs the comparison result as an intermittent dimmer signal, which is next inputted into the switching circuit 9 of the DC/AC converter 6. According to this signal, the switching circuit 9 is turned on or off.

More specifically, for a period during which the sawtoothed wave is lower than the dimming command signal in voltage, the switching circuit 9 is turned on. At the same time, the DC/AC converter 6 generates the high-frequency voltage, so that the electrode-less fluorescent lamp 3 lights up.

On the other hand, for a period during which the sawtoothed wave is higher than the dimming command signal in voltage, the switching circuit 9 is turned off. This means that the DC/AC converter 6 does not generates the high-frequency voltage and the lamp 3 does not illuminate. Accordingly, the DC/AC converter 6 generates a high-frequency voltage on which synchronous duty modulation has been performed. This high-frequency voltage is in sync with the turn-on of the phase-controlled AC voltage outputted from the dimmer 2, and is generated only for a duty cycle corresponding to that turn-on period. The high-frequency voltage is then applied to the electrode-less fluorescent lamp 3, and as a result, the dimming capability becomes operational.

The explanation has been given for a case where the dimming controller 7 has a construction for outputting a signal to bring the turn-on of the phase-controlled AV voltage into sync with the lighting-up through the intermittent drive by the DC/AC converter 6. With this synchronization, a more preferable dimming operation can be executed.

Next, an operation performed by the discharge lamp lighting apparatus of the first embodiment of the present invention is explained.

First, phase control is performed on an output voltage of the AC power 1 by the dimmer 2. The phase-controlled AC voltage is then converted into a DC voltage by the AC/DC converter 5. Following this, with an output of a driving frequency f1 (kHz) from the oscillator 8, the driving circuit 10 of the MOSFETs 11 and 12 included in the DC/AC converter 6 is driven. By alternately turning on and off the MOSFETs 11 and 12, the DC/AC converter 6 converts the DC voltage smoothed by the AC/DC converter 5 into a high-frequency voltage.

This high-frequency voltage is applied to a resonant circuit which is composed of the resonant inductor 13, the pair of resonant capacitors 14 and 15, and the induction coil 16. The current passing through the induction coil 16 generates a DC electromagnetic field inside the electrodeless discharge bulb 17. With energy provided by the DC electromagnetic field, a light emitting gas (not shown) filled in the electrode-less discharge bulb 17 is stimulated to emit light. As the light emitting gas, one of mercury, krypton, and xenon, or a mixed gas employing some of these materials may be used. In some cases, an inert gas without mercury can be used as the light emitting gas.

The dimming controller 7 detects timing of the turn-on of the phase-controlled voltage, generates an intermittent command signal synchronized with this turn-on, and then transmits this signal to the switching circuit 9. While the intermittent command signal is transmitted, i.e., while the lamp 3 is lighting up, the switching circuit 9 stays on and at the same time the driving circuit 10 of the MOSFETs 11 and 12 also stays on. Meanwhile, while the intermittent command signal is not transmitted, i.e., while the lamp 3 is not illuminating, the switching circuit 9 stays off and the driving circuit 10 of the MOSFETs 11 and 12 also stays off.

While the switching circuit 9 is activated, the MOSFETs 11 and 12 alternately repeat turning on and off at the driving frequency f1 (kHz). In accordance with a variation in the conduction period of the phase-controlled voltage, the ratio between the activation and deactivation periods of the switching circuit 9 that is set according to the intermittent command signal from the dimming controller 7 varies. In response to this variation in the ratio, a ratio between the activation and deactivation periods of the MOSFETs 11 and 12 also varies. Here, the ratio between the activation and deactivation periods of the MOSFETs 11 and 12 is referred to as a duty ratio. Depending on the variation in the duty ratio, an input of electrical energy to the electrode-less fluorescent lamp 3 accordingly varies. In this way, a dimming operation for the electrode-less fluorescent lamp 3 is performed.

The following is a brief explanation about the frequency f1 (kHz) of the high-frequency voltage that the lighting circuit 4 applies to the electrode-less fluorescent lamp 3 of the bulb-shaped electrode-less fluorescent lamp of the present invention.

The frequency of the present embodiment is set relatively low in comparison with several megahertz in the ISM (Industrial, Science, and Medical) band for practical, common use. To be more specific, the frequency is set at 1 MHz or lower, ranging from 50 to 500 kHz, for instance. The reason to employ a frequency in the low range is given as follows.

If employing a frequency, like several megahertz, in the relatively high frequency range, a noise filter to suppress line noises occurring to a high-frequency power circuit in a lighting circuit of a circuit board has to be large in size, resulting in an increase of the high-frequency power circuit in size as a matter of course. Moreover, for a case where a noise radiated or transmitted from the lamp is of high frequency, a costly shield will be required to follow the very strict regulation concerning high-frequency noises. This will be a serious obstacle to carry out cost reduction.

On the other hand, employing a frequency in the low frequency band as low as 1 MHz to 50 kHz, a component to be included in the high-frequency power circuit can be a small-sized, low-cost, general-purpose product that is used as an electronic component of common electronic equipment. As such, reduction in size as well as in cost can be advantageously achieved. Note that, however, the frequency at which the electrode-less fluorescent lamp of the present embodiment is capable of operating is not limited below 1 MHz. The lamp can operate at a high frequency like several megahertz, for example.

Figure 6:
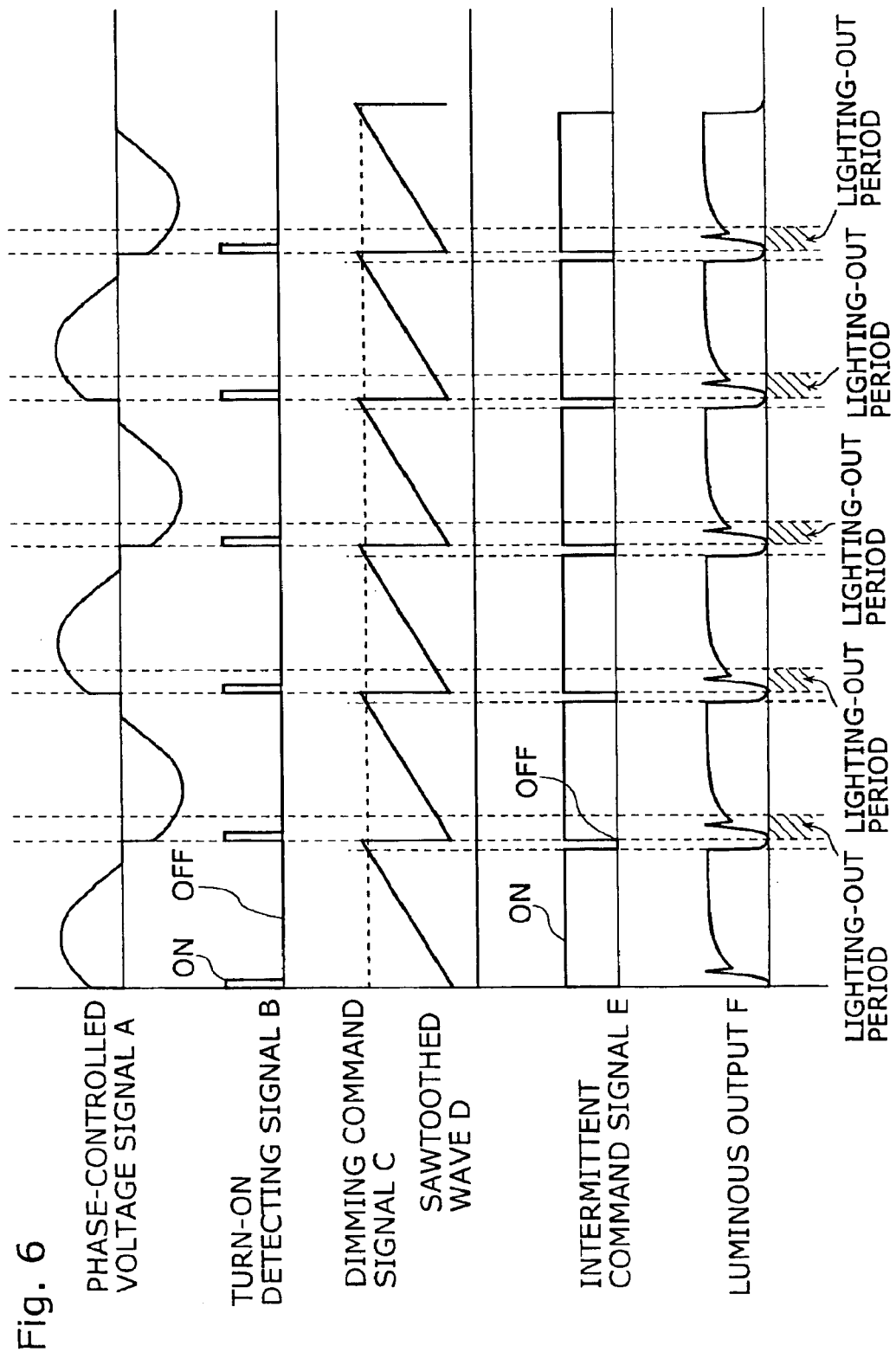
FIG. 6 is a diagram showing waveforms generated when an intermittent drive is activated.

The following is a detailed description of an operation performed by the dimming controller 7 with reference to a timing chart shown in FIG. 6.

FIG. 6 shows waveforms of, with respect to time, a phase-controlled voltage signal A, a turn-on detecting signal B, a dimming command signal C, a sawtoothed wave D, an intermittent command signal E, and a luminous output F. The horizontal axis denotes time and is used as a common scale for all of the signals shown in FIG. 6.

The phase-controlled voltage shown as the signal A in FIG. 6 is outputted from the dimmer 2 of FIG. 1 and inputted into the dimming control signal inputting unit A18 of the dimming controller 7. The unit 18A performs full-wave rectification on the voltage, and decreases the voltage appropriately so as to drive the photo-coupler 19 before applying it to the photo-coupler 19. Here, an appropriate voltage to drive the photo-coupler 19 may be 2V for example.

Upon the turn-on of the phase-controlled voltage by the dimmer 2, the full-wave rectified voltage to be inputted into the photo-coupler 19 is turned on at the same time. After a rise time of the photo-coupler 19 has passed, a light emitting diode included in the photo-coupler 19 starts emitting light. The rise time of the photo-coupler 19 may be 20 µs, for example. With this light emission, the transistor included in the photo-coupler 19 outputs a pulse wave synchronized with the turn-on and turn-off of the phase-controlled voltage signal A shown in FIG. 6. This pulse wave is then inputted into the sawtoothed wave generating circuit 20 and passes through the differentiating circuit 201 and the diode 202. As a result, the pulse wave becomes the turn-on detecting signal B that is in sync only with the turn-ons of the phase-controlled voltage signal A.

The turn-on detecting signal B is inputted into the base terminal of the transistor 203 used for discharge in the sawtoothed wave generating circuit 20. With this signal input, charging and discharging processes are performed on the capacitor 204 connected between the emitter and collector terminals of the transistor 203, and the signal is outputted as the sawtoothed wave D via a buffer amplifier. Here, this buffer amplifier is a voltage follower using an operational amplifier.

In the meantime, the phase-controlled voltage signal A is inputted into the dimming control signal inputting unit B21 of the dimming controller 7 in FIG. 1, where half-wave rectification is performed on the signal. After this, the rectified part is integrated by the dimming command signal generating circuit 22 and outputted as the dimming command signal C.

The sawtoothed wave D and the dimming command signal C are respectively inputted to the non-inverse input terminal and the inverse input terminal of the comparator 204. As the comparison result showing an electric potential difference between the wave D and the signal C, the intermittent command signal E is outputted. Note that the signal E in FIG. 6 shows an inverted version of the logic that the actual signal outputted from the comparator 204 demonstrates. The intermittent command signal E is then transmitted to the switching circuit 9. While the signal E is on, a clock signal at the driving frequency f1 (kHz) is supplied to the driving circuit 10 by the oscillator 8. Also, the pair of MOSFETs 11 and 12 of the DC/AC converter 6 are driven at the driving frequency f1 (kHz) and, as a result, the luminous output F is obtained.

This on-state of the intermittent command signal E is maintained until the time comes when the electric potential of the sawtoothed wave D will reach higher than the electric potential of the dimming command signal C. When the potential relation is inverted, the signal E becomes off, which is then transmitted so to the switching circuit 9. Accordingly, the activation of the MOSFETs 11 and 12 is halted, and the light goes out.

In this way, the duty of the intermittent command signal E depends on the potential relation between the sawtoothed wave D and the dimming command signal C. The light is up while the intermittent command signal E is on, and the light is out while the signal E is off. This repetition of on and off is outputted as the intermittently dimmed luminous output F.

As shown in FIG. 5, three diodes are connected to the emitter terminal of the transistor 203 included in the sawtoothed wave generating circuit 20 in order to keep a predetermined electric potential even after the capacitor 204 fully discharged. A forward voltage of these three diodes is about 0.6V, meaning that the electric potential of the sawtoothed wave is about 1.8V at the minimum.

Since the charging and discharging processes are performed on the capacitor 204 in the sawtoothed wave generating circuit 20 using the turn-on signals of the phase-controlled voltage as triggers, the sawtoothed wave D keeps a constant shape even if a conduction angle of the phase-controlled voltage varies. On the other hand, the electric potential of the dimming command signal C varies because the half-wave rectified part of the phase-controlled voltage has been integrated. When the electric potential of the signal C falls below a predetermined, or equivalently in the present embodiment, the minimum electric potential of the sawtoothed wave, the intermittent command signal E is completely turned off. Also, when the phase-controlled voltage is at equal to or smaller than a predetermined conduction angle, or more specifically, at equal to or smaller than a conduction angle where the minimum electric potential of the sawtoothed wave D is equal to that of the dimming command signal C, the activation of the MOSFETs 11 and 12 is halted and the light goes out.

Accordingly, by adjusting the minimum electric potential of the sawtoothed wave, the activation of the MOSFETs 11 and 12 is halted at an arbitrary phase level of the phase-controlled voltage, thereby enabling the light to extinguish.

Next, an explanation is given for a mechanism where a malfunction occurs to the dimmer 2 when the light intensity is switched from a full state to a dimmed state. A mechanism where discontinuous luminous change, or so-called flicker, occurs is also explained.

Figure 7:
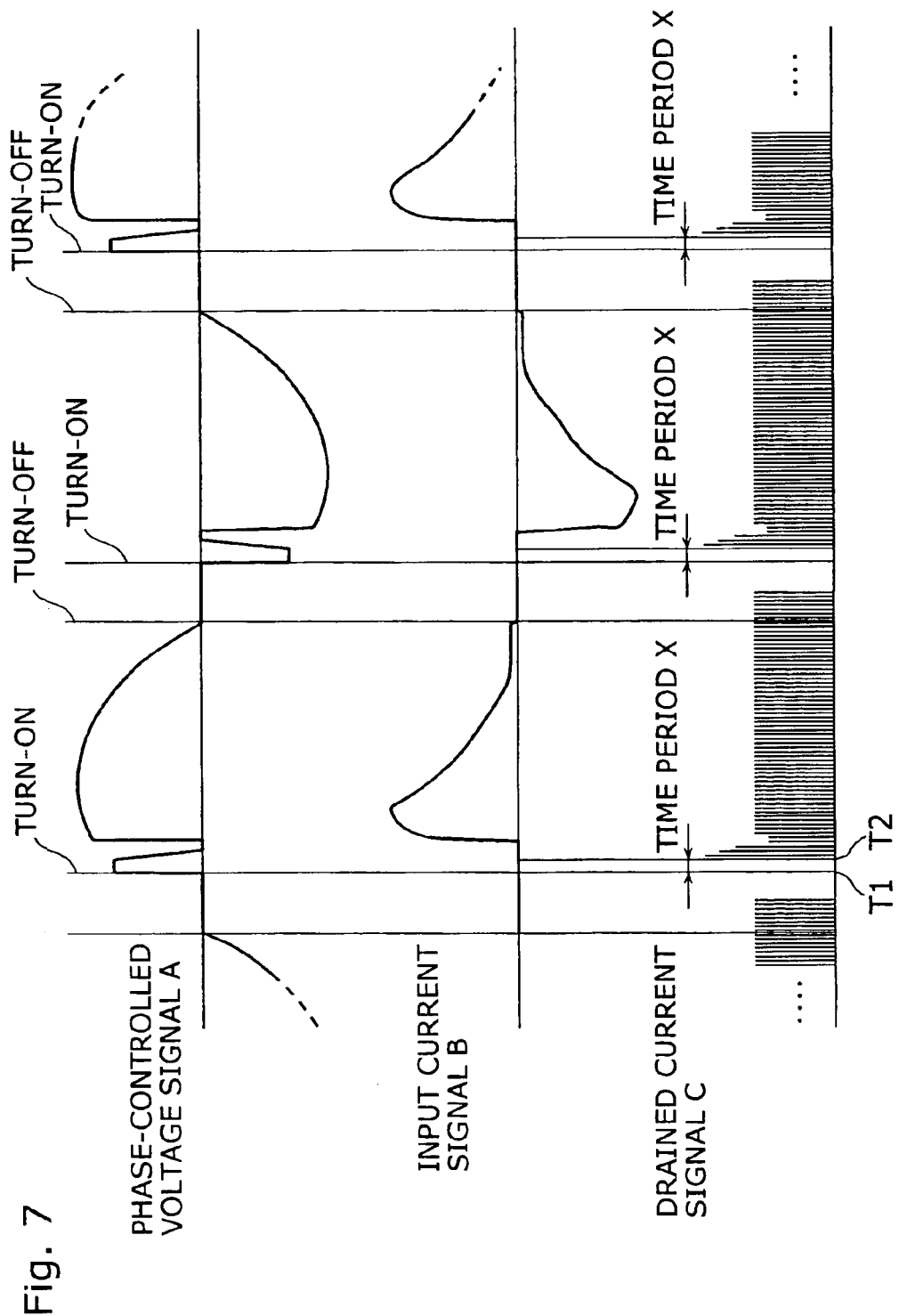
FIG. 7 is a diagram showing waveforms generated when the dimmer malfunctions.

FIG. 7 shows signal waveforms generated in a case where the photo-coupler 26, the timer circuit 27, the switching element 28, and the resistor 29 are not provided in the dimming controller 7 in contrast to the construction shown in FIG. 1. To be more specific, FIG. 7 shows waveforms of a phase-controlled voltage signal A of the dimmer 2, an input current signal B of the lighting circuit 4, and a drained current signal C of the MOSFET 12 of the DC/AC converter 6 serving as an inverter.

FIG. 7 illustrates a comparison between the phase-controlled voltage signal A and the drained current signal C. Upon the turn-on of the signal A indicated as T1 in FIG. 7, the current is not drained at the moment. The drained current appears at T2 as shown in FIG. 7. This shows that the timing of the intermittent drive lags behind the timing of the turn-on of the phase-controlled voltage. This time lag can be expressed as "T1–T2." Due to this time lag, the input current of the lighting circuit 4, or equivalently, the current of the dimmer 2, does not flow even though the dimmer 2 is already turned on. A time period during which the current does not flow is referred to as "X" in FIG. 7, and this X can be obtained by calculating the expression "T1–T2." When the current does not pass through the dimmer 2, the holding current of the triac 2b included in the dimmer 2 cannot be secured. As a result, until the time comes when DC/AC converter 6 will operate with stability, the triac 2b stays open, that is, the dimmer 2 is turned off. Consequently, a part of the waveform of the phase-controlled voltage signal A marks a deep decline as shown in FIG. 7, denoting that a malfunction is occurring to the dimmer 2. The dimming command signal C is generated based on the voltage signal A and if the voltage signal A forms a malfunction waveform, the dimming command signal becomes accordingly unstable, causing the intermittent command signal instability in turn. Because of the instability of these signals, the ratio between the lighting-up and lighting-out periods through the intermittent drive varies. This variation will result in the discontinuous luminous change which is to say unevenness in dimming or so-called flicker. The discontinuous luminous change may give a user discomfort since such a luminous change does not occur to a conventional incandescent lamp.

The following is an explanation about how the above-mentioned malfunction of the dimmer 2 is suppressed by the dimming controller 7 shown in FIG. 1 when the dimming operation is performed, with reference to a timing chart of FIG. 8.

FIG. 8 shows signal waveforms generated in a case where the photo-coupler 26, the timer circuit 27, the switching element 28, and the resistor 29 are provided in the dimming controller 7 as is the case shown in FIG. 1. To be more specific, FIG. 8 shows waveforms of a phase-controlled voltage signal A of the dimmer 2, an input current signal B of the lighting circuit 4, a drained current signal C of the MOSFET 12 of the DC/AC converter 6, and an increased input current signal D of the lighting circuit 4.

As illustrated by the waveform of the increased input current D in FIG. 8, there is no time lag for the turn-on of the phase-controlled voltage signal A owing to the construction where the photo-coupler 26, the timer circuit 27, the switching element 28, and the resistor 29 are provided in the dimming controller 7. During the turn-on period set by the timer circuit 27, a current equal to or larger than a holding current value of the triac 2b of the dimmer 2 passes from the higher-potential output terminal of the AC/DC converter 5 to a ground, i.e., to the lower-potential output terminal of the AC/DC converter 5. Here, the turn-on period set by the timer circuit 27 is equal to or longer than the period X that is the time lag between the turn-on of the phase-controlled AC voltage and the generation of the high-frequency voltage by the DC/AC converter 6. Also, the holding current value of the triac 2b refers to the threshold.

With reference to FIG. 8, suppose that the drained current C of the MOSFET 12 of the DC/AC converter 6 lags behind the timing of the intermittent drive that is synchronized with the timing of the turn-on of the phase-controlled voltage signal A. Even with this being the situation, the dimmer 2 is kept being amply supplied with a current equal to or larger than its holding current from the activation to the deactivation. This can be clearly understood by referring to the input current signal B in FIG. 8 that is the sum of the increased input current signal D and the input current signal B of FIG. 7. In consequence, the normal waveform of the phase-controlled voltage signal A as shown in FIG. 8 is obtained, where no malfunctions are occurring to the dimmer 2.

By means of the present embodiment as described so far, the holding current of the dimmer 2 is secured so that the dimmer 2 can stay activated even before the DC/AC converter 6 begins an operation. Thus, like the phase-controlled voltage signal A shown in FIG. 8, the output waveform of the dimmer 2 is normal with no indication of malfunctions. Furthermore, both the dimming command signal and the intermittent command signal become stable, resulting in the reduction in variation of the ratio between the lighting-up and lighting-out periods while the intermittent drive is activated. With this being the situation, discontinuous luminous change does not happen, so the stated problem causing the user discomfort is overcome.

Accordingly, by means of the present embodiment, a current equal to or larger than the threshold is applied across the output terminals of the AC/DC converter 5 for at least the duration of time between the turn-on of the phase-controlled AC voltage and the generation of the high-frequency voltage by the DC/AC converter 6. Hence, a stable dimming operation is realized without discontinuous luminous change which is unevenness in dimming or flicker, thereby giving the user no discomfort. Moreover, the discharge lamp lighting apparatus of the present embodiment can be connected to an existing dimmer 2, and it is possible for the lighting apparatus to replace a bulb. Because of this convenient replacement, a bulb-shaped electrode-less fluorescent lamp with a dimming capability will come into wider use.

Here, the duration of time between the turn-on of the phase-controlled AC voltage and the generation of the high-frequency voltage by the DC/AC converter 6 is preferably 1.5 ms (millisecond) or longer in consideration of the average time lag. Also, there is no problem to keep applying a current equal to or larger than the threshold across the output terminals of the AC/DC converter 5. However, it is not preferable to keep applying a current equal to or larger than the holding current of the triac 2b used in a common dimmer 2 because, if doing so, power measured 1 to 2 W is kept being consumed. For this reason, the stated period of time should be 4 ms or shorter that is an acceptable time duration to minimize power waste.

With the construction shown in FIG. 1, the photo-coupler 26, the timer circuit 27, the switching element 28, and the resistor 29 are provided in the dimming controller 7. Owing to these components, a current equal to or larger than the threshold is applied across the output terminals of the AC/DC converter 5 for at least duration of the time lag between the turn-on of the phase-controlled AC voltage and the generation of the high-frequency voltage by the DC/AC converter 6. However, the present invention is not limited to this construction as long as the prevention can be achieved against a malfunction occurring to the dimmer 2 due to lack of the holding current immediately following the turn-on of the phase-controlled AC voltage. For example, a capacitor may replace the resistor 29 so that a current can be applied across the output terminals of the AC/DC converter 5 depending on an impedance of the capacitor for a certain period of time after the turn-on of the phase-controlled AC voltage.

In the present embodiment, an explanation has been given for a case where a discharge lamp lighting apparatus is applied to a bulb-shaped electrode-less fluorescent lamp. However, the present invention can be applied to a bulb-shaped electrode-less discharge lamp that has no fluorescent material. To be more specific, an electrode-less discharge lamp whose discharge bulb's surface is not coated with fluorescent material, such as a bactericidal lamp or the like, can be applicable.

Furthermore, a use for the present invention is not limited to common lighting. For example, the lighting apparatus of the present invention can light up health-care lamps that have action spectra effective in treating erythema and in producing vitamin D. Also, a lamp for botanical cultivation that has action spectra effective in plant photosynthesis and morphogenesis can be lit up by the present invention.

As can be understood by referring to the schematic circuit diagram of FIG. 1, the construction of the present embodiment is not limited to the shape of a bulb. The electrode-less discharge lamp lighting apparatus of the present invention can take on a shape where the electrode-less fluorescent lamp 3 and the lighting circuit 4 are separately constructed.

Moreover, the sawtoothed wave generating circuit 20 of the dimming controller 7 may be replaced by a circuit using an IC (integrated circuit) like a monostable multivibrator, or replaced by a triangular wave generating circuit. Also, the timer circuit 27 may be replaced by a circuit using an IC for a timer such as μPD5555C of NEC corporation.

(Second Embodiment)

The following is a description of a discharge lamp lighting apparatus according to a second embodiment of the present invention.

Figure 9:
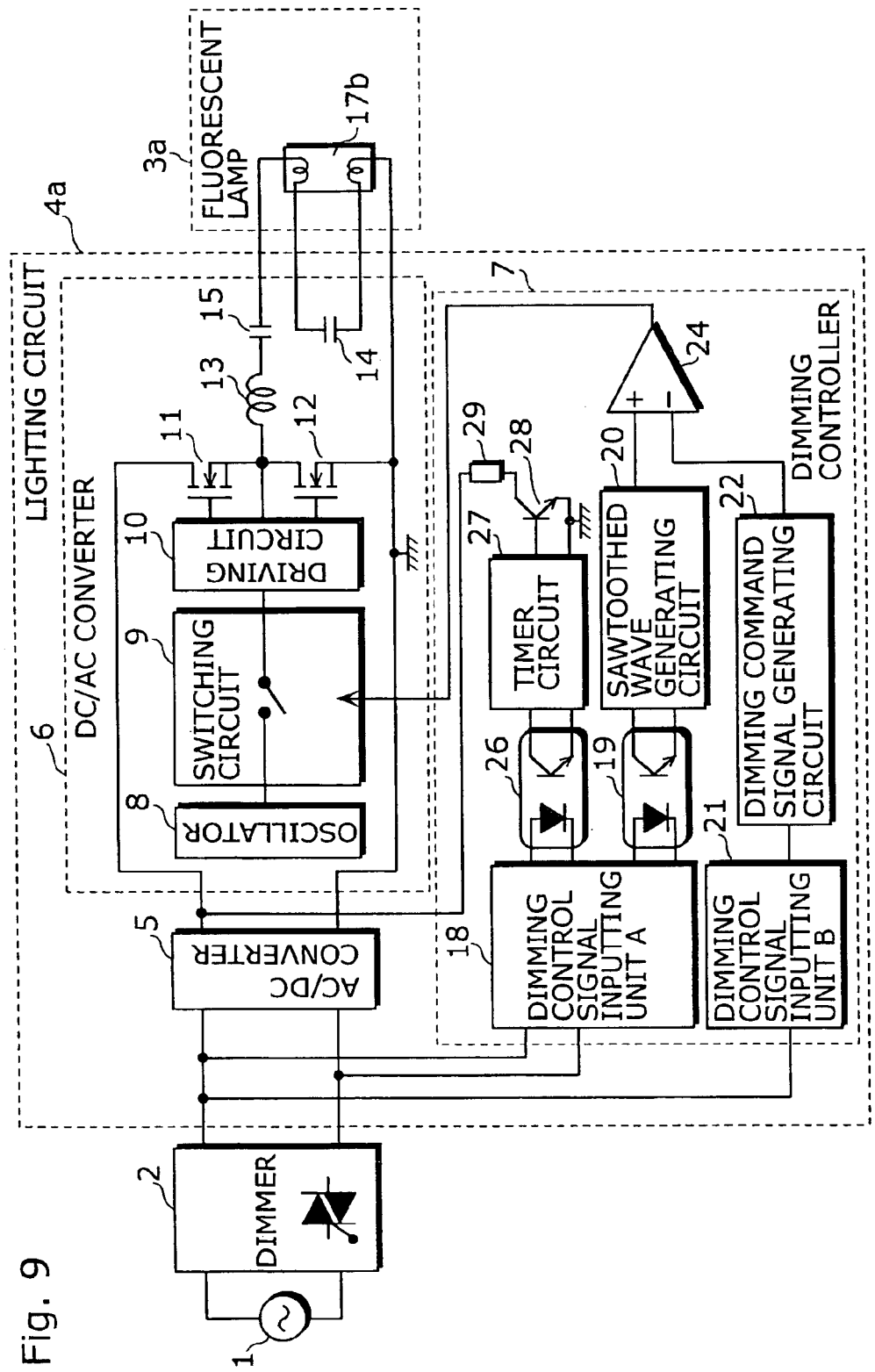
FIG. 9 is a diagram showing the circuit construction of a discharge lamp lighting apparatus of a second embodiment of the present invention.

FIG. 9 is a diagram showing the circuit construction of the discharge lamp lighting apparatus of the second embodiment of the present invention. This discharge lamp lighting apparatus is capable of dimming an electrode fluorescent lamp which is a kind of discharge lamps, and is mainly composed of a lighting circuit 4a and an electrode fluorescent lamp 3a. Note that FIG. 9 shows an AC power 1 and a dimmer 2 together with the discharge lamp lighting apparatus.

The discharge lamp lighting apparatus of the present embodiment is different from that of the first embodiment in that a discharge bulb 17b has electrodes. Another difference is that a load resonant circuit is included in the lighting circuit 4a to light up the electrode fluorescent lamp 3a. Therefore, the common components are assigned the same numerals as in the first embodiment and no detailed explanation is given. The following description is focused on the different construction.

As shown in FIG. 9, for the discharge lamp lighting apparatus of the present embodiment, an LC resonant circuit is connected between drain and source terminals of a MOS-FET 12. The LC resonant circuit is composed of the electrode fluorescent lamp 3a, a resonant inductor 13, a resonant capacitor 15, and a resonance/afterheat capacitor 14.

With this construction, suppose that a high voltage as a resonant voltage is generated between the terminals of the capacitor 14 of the LC resonant circuit. In this case, a pair of electrodes in the discharge bulb 17b rises in temperature because of an afterheat current, facilitating the appearance of heat electrons from the electrodes. Then, the discharge bulb 17b produces an electrical breakdown and begins to discharge. Once the discharge bulb 17b begins to discharge, the resonant inductor 13 controls a current passing through the discharge bulb 17b so as to keep the discharging stable.

By means of the discharge lamp lighting apparatus of the present embodiment, an electrode fluorescent lamp having a dimming capability can be lit up with stability.

As can be understood from the first and second embodiments, the discharge lamp lighting apparatus of the present invention includes the electrode fluorescent lamp 3a as well as the electrode-less fluorescent lamp 3. However, it is more desirable for the lighting circuit 4, which is driven intermittently, to be combined with the electrode-less fluorescent lamp 3 rather than with the electrode fluorescent lamp 3a. More specifically, the intermittent drive is an operation where on and off are alternately repeated, causing excessive exhaustion of the electrodes. Therefore, for the case of the electrode fluorescent lamp 3a, its useful life may be shortened. On the contrary, the electrode-less fluorescent lamp 3 has no electrodes to begin with, and such a problem will never occur. This is the reason why the lighting circuit 4 is preferably to be combined with the electrode-less fluorescent lamp 3.

INDUSTRIAL APPLICABILITY

The present invention can be used as a lighting apparatus for a discharge lamp with a dimming capability, and in particular as an electrode-less discharge lamp lighting apparatus and a bulb-shaped electrode-less fluorescent lamp each having dimming capabilities.

What is claimed is:

1. An electrode-less discharge lamp lighting apparatus which is electrically connected to a dimming unit, comprising:

an electrode-less discharge lamp; and a lighting circuit operable to apply a high-frequency voltage to the electrode-less discharge lamp, wherein the lighting circuit includes:

an AC/DC converting unit operable to convert a phase-controlled AC voltage outputted from the dimming unit into a DC voltage;

a DC/AC converting unit operable to convert the DC voltage into a high-frequency voltage and operable to intermittently drive the electrode-less discharge lamp by applying the high-frequency voltage to the electrode-less discharge lamp during a lighting-up period of the electrode-less discharge lamp so that the electrode-less discharge lamp illuminates and by halting a generation of the high-frequency voltage during a lighting-out period of the electrode-less discharge lamp so that the electrode-less discharge lamp is extinguished; and a dimming controlling unit operable to detect a timing of a turn-on of the phase-controlled AC voltage, wherein, based on the detected timing, the dimming controlling unit outputs an intermittent command signal to vary a ratio between the lighting-up and lighting-out periods and allows a current whose value is at least a threshold to flow across output terminals of the AC/DC converting unit for at least a duration of a time lag between the turn-on of the phase-controlled AC voltage and the generation of the high-frequency voltage by the DC/AC converting unit.

2. The electrode-less discharge lamp lighting apparatus according to claim 1,
wherein the dimming unit includes a switching element operable to pass a current in both directions, and
the threshold is a value of a minimum current required for the switching element to keep a turn-on state.

3. The electrode-less discharge lamp lighting apparatus according to claim 2,
wherein the switching element is a triac, and
the threshold is a value of a holding current of the triac.

4. The electrode-less discharge lamp lighting apparatus according to claim 1,
wherein the dimming controlling unit includes:
a timer circuit operable to output a signal indicating a period of time that lasts at least the time lag; and
a switching element operable to allow a current whose value is at least the threshold to flow across the output terminals of the AC/DC converting unit via a resistor for the period of time indicated by the signal inputted by the timer circuit.

5. The electrode-less discharge lamp lighting apparatus according to claim 4,
wherein the dimming controlling unit further includes:
a dimming control signal inputting circuit operable to output a signal indicating the turn-on of the phase-controlled AC voltage; and
a signal transmitting circuit operable to transmit the signal outputted from the dimming control signal inputting circuit to the timer circuit in a state where the signal transmitting circuit is electrically isolated.

6. The electrode-less discharge lamp lighting apparatus according to claim 5,
wherein the timer circuit includes:
a capacitor;
a differentiating circuit operable to differentiate the signal transmitted by the signal transmitting circuit;
a switching element operable to allow the capacitor one of to be charged and to discharge in accordance with an output from the differentiating circuit; and
a comparator operable to compare an electric potential of the capacitor to a predetermined electric potential and output a signal as a comparison result that indicates the period of time that lasts at least the time lag.

7. The electrode-less discharge lamp lighting apparatus according to claim 1,
wherein the dimming controlling unit, when a dimming state set by the intermittent command signal is one of a full-state and a dimmed state, allows the current whose value is at least the threshold to flow across the output terminals of the AC/DC converting unit for at least the duration of the time lag between the turn-on of the phase-controlled AC voltage and the generation of the high-frequency voltage by the DC/AC converting unit.

8. The electrode-less discharge lamp lighting apparatus according to claim 1,
wherein the dimming controlling unit further includes:
a sawtoothed wave signal generating circuit operable to generate one of a sawtoothed wave signal and a triangular wave signal that is synchronized with the timing of the turn-on of the phase-controlled AC voltage;
a dimming command signal generating circuit operable to generate a dimming command signal that carries a voltage corresponding to a period of time during which the phase-controlled AC voltage is turned on; and
a comparator operable to compare one of the sawtoothed wave signal and the triangular wave signal to the dimming command signal and output the intermittent command signal as a comparison result.

9. The electrode-less discharge lamp lighting apparatus according to claim 8,
wherein the dimming controlling unit further includes:
a dimming control signal inputting circuit operable to output a signal indicating the turn-on of the phase-controlled AC voltage; and
a signal transmitting circuit operable to transmit the signal outputted from the dimming control signal inputting circuit to the sawtoothed wave signal generating circuit in a state where the signal transmitting circuit is electrically isolated.

10. The electrode-less discharge lamp lighting apparatus according to claim 9,
wherein the sawtoothed wave signal generating circuit includes:
a capacitor;
a differentiating circuit operable to differentiate the signal transmitted by the signal transmitting circuit;
a switching element operable to allow the capacitor one of to be charged and to discharge in accordance with an output from the differentiating circuit; and
an outputting circuit operable to output an electric potential of the capacitor as one of the sawtoothed wave signal and the triangular wave signal.

11. A bulb-shaped electrode-less fluorescent lamp which is electrically connected to a dimming unit, comprising:
an electrode-less fluorescent lamp;
a lighting circuit operable to apply a high-frequency voltage to the electrode-less fluorescent lamp; and
a base operable to electrically connect the dimming unit to the lighting circuit,
wherein the electrode-less fluorescent lamp, the lighting circuit, and the base are formed in one piece in a shape of a bulb, and
wherein the lighting circuit includes:
an AC/DC converting unit operable to convert a phase-controlled AC voltage outputted from the dimming unit via the base into a DC voltage;
a DC/AC converting unit operable to convert the DC voltage into a high-frequency voltage and operable to intermittently drive the electrode-less discharge lamp by applying the high-frequency voltage to the electrode-less fluorescent lamp during a lighting-up period of the electrode-less fluorescent lamp so that the electrode-less fluorescent lamp illuminates and by halting a generation of the high-frequency voltage during a lighting-out period of the electrode-less fluorescent lamp so that the electrode-less fluorescent lamp is extinguished; and
a dimming controlling unit operable to detect a timing of a turn-on of the phase-controlled AC voltage, wherein, based on the detected timing, the dimming controlling unit outputs an intermittent command signal to vary a ratio between the lighting-up and lighting-out periods and allows a current whose value is at least a threshold to flow across output terminals of the AC/DC converting unit for at least a duration of a time lag between the turn-on of the phase-controlled AC voltage and the generation of the high-frequency voltage by the DC/AC converting unit.

12. The bulb-shaped electrode-less fluorescent lamp according to claim 11, wherein the electrode-less fluorescent lamp has a concave part, and an induction coil to which the high-frequency voltage is applied is inserted into the concave part.

13. The bulb-shaped electrode-less fluorescent lamp according to claim 12, wherein the dimming unit includes a switching element operable to pass a current in both directions, and the threshold is a value of a minimum current required for the switching element to keep a turn-on state.

14. The bulb-shaped electrode-less fluorescent lamp according to claim 13, wherein the switching element included in the dimming unit is a triac, and the threshold is a value of a holding current of the triac.

15. A discharge lamp lighting apparatus which is electrically connected to a dimming unit, comprising:

a discharge lamp; and a lighting circuit operable to apply a high-frequency voltage to the discharge lamp, wherein the lighting circuit includes:

an AC/DC converting unit operable to convert a phase-controlled AC voltage outputted from the dimming unit into a DC voltage;

a DC/AC converting unit operable to convert the DC voltage into a high-frequency voltage and operable to intermittently drive the discharge lamp by applying the high-frequency voltage to the discharge lamp during a lighting-up period of the discharge lamp so that the discharge lamp illuminates and by halting a generation of the high-frequency voltage during a lighting-out period of the discharge lamp so that the discharge lamp is extinguished; and a dimming controlling unit operable to detect a timing of a turn-on of the phase-controlled AC voltage, wherein, based on the detected timing, the dimming controlling unit outputs an intermittent command signal to vary a ratio between the lighting-up and lighting-out periods and allows a current whose value is at least a threshold to flow across output terminals of the AC/DC converting unit for at least a duration of a time lag between the turn-on of the phase-controlled AC voltage and the generation of the high-frequency voltage by the DC/AC converting unit.

* * * * *